United States Patent [19]

Lindblad

[11] Patent Number: 5,404,277

[45] Date of Patent: Apr. 4, 1995

[54] APPARATUS FOR BACKLIGHTING LCD

[76] Inventor: Edward W. Lindblad, 8817 E. Dahlia Dr., Scottsdale, Ariz. 85260

[21] Appl. No.: 18,273

[22] Filed: Feb. 16, 1993

[51] Int. Cl.⁶ .................................................. F21V 8/00
[52] U.S. Cl. .................................... 362/31; 362/26; 362/800; 359/49; 313/498
[58] Field of Search ................. 359/49; 362/26, 27, 362/31, 34, 84, 29, 800; 313/498, 499, 501

[56] References Cited

U.S. PATENT DOCUMENTS

| | | | |
|---|---|---|---|
| 3,780,357 | 12/1973 | Haitz | 313/498 |
| 3,883,772 | 5/1975 | Wako et al. | 313/499 |
| 4,257,084 | 3/1981 | Reynolds | 362/31 |
| 4,528,617 | 7/1985 | Blackington | 362/32 |
| 4,698,730 | 10/1987 | Sakai et al. | 362/800 |
| 4,714,983 | 12/1987 | Lang | 362/31 |
| 4,845,595 | 7/1989 | Fujii et al. | 362/29 |
| 4,929,062 | 5/1990 | Guzik et al. | 362/31 |
| 4,959,759 | 9/1990 | Kohler | 362/29 |
| 5,008,788 | 4/1991 | Palinkas | 362/800 |

FOREIGN PATENT DOCUMENTS 293506  11/1988  Japan ................................. 359/48

Primary Examiner—Ira S. Lazarus
Assistant Examiner—Alan B. Cariaso
Attorney, Agent, or Firm—Tod R. Nissle

[57] ABSTRACT

Apparatus for backlighting a liquid crystal display has an operational life of at least one hundred thousand hours and can be manufactured using a light source which has about one-seventh the cost of prior art light sources. The apparatus utilizes dies which laterally emit light into a light pipe.

2 Claims, 1 Drawing Sheet

APPARATUS FOR BACKLIGHTING LCD

This invention relates to an apparatus for generating and distributing light in a uniform manner over a light output surface.

More particularly, the invention relates to an apparatus for backlighting a liquid crystal display (LCD).

In a further respect, the invention relates to a LCD backlighting apparatus which has a typical operational life of at least 100,000 hours and which can be manufactured using a light source which has about one-seventh the cost of prior art light sources.

In still a further respect, the invention relates to LCD backlighting apparatus which, when mounted on a printed circuit board, extends only a short distance outwardly from the board, typically only one hundred and twenty to one hundred and fifty thousandths of an inch.

Backlighting systems are well known in the art, particularly in connection with LCDs. A typical prior art system is illustrated in U.S. Pat. No. 4,528,617 to Blackington. The Blackington backlighting system has several disadvantages. First, it is advantageous to have the capability of positioning a backlight at any position on a circuit board. The fiber optical cable F illustrated in FIG. 1A of the Blackington patent limits this capability because of the size and limited flexibility of the fiber optic cable. Second, vertical and lateral space on a printed circuit board is at a premium. Minimizing the size of the space occupied by the backlighting system is important. In the Blackington system, the fiber optic cable can extend over a significant amount of space on a printed circuit board. Third, the cost of producing a backlighting system should be minimized. The light producing component used in prior art back light system typically costs in excess of seventy cents a unit. For example, the Blackington patent refers at Col. 1, lines 46 and 47 to incandescent lamps. Incandescent lamps for an LCD backlight apparatus typically cost about twenty cents, which, practically speaking, makes them too expensive to use. Another light source commonly utilized with a backlight apparatus is an LED. At present an LED typically costs about seven cents. Fiber optic systems like those illustrated in the Blackington patent are also relatively expensive.

Accordingly, it would be highly desirable to provide an improved backlighting apparatus which could readily be mounted at different positions on a printed circuit board, which would have a low profile and minimize the distance which the back lighting apparatus extended away from the board, and which would reduce the cost of producing a backlighting apparatus for a LCD.

Therefore, it is a principal object of the invention to provide an improved backlighting apparatus.

A further object of the invention is to provide improved backlighting apparatus which does not require the use of fiber optic cables, LEDs, or incandescent lamps and which significantly reduces the cost of manufacture of the backlighting apparatus.

Another object of the invention to provide an improved backlighting apparatus which can be mounted on a printed circuit board and extend only a short distance, typically 0.010 to 0.250 inch, out from the surface of the circuit board.

These and other, further and more specific objects of the invention will be apparent to those skilled in the art from the following detailed description thereof, taken in conjunction with the drawings in which.

Briefly, in accordance with my invention, I provide an improved liquid crystal display (LCD) assembly. The assembly includes a LCD and a means for backlighting the LCD. The backlighting means includes a printed circuit board; a light pipe mounted on the printed circuit board and having a wing spaced about the circuit board and including a light reflective surface canted with respect to the circuit board; and, a light generating die mounted on the circuit board intermediate the wing and the circuit board. Light from the die travels upwardly away from the circuit board and toward and into the wing, and reflects off of the reflective surface in directions of travel generally parallel to the circuit board and the LCD to travel into the light pipe to backlight the LCD.

In another embodiment of my invention, I provide an improved light pipe assembly. The light pipe assembly includes a printed circuit board; includes a light pipe mounted on the printed circuit board and having a light reflective surface canted with respect to the circuit board; and, includes a light generating die mounted on the circuit board. Light from the die travels upwardly away from the circuit board towards and into the wing. The light reflects off of the reflective surface in directions of travel generally parallel to the circuit board.

In a further embodiment of my invention, I provide an improved light pipe assembly. The light pipe assembly includes a light transparent member having a bottom, an upper light output surface, and a side portion including a light reflective surface canted to reflect light into the light transparent member toward the upper light output surface. The light is provided by a die positioned beneath the bottom; the side portion, and the upper light output surface of the transparent member to transmit light through the bottom and against the light reflective surface for reflection inwardly generally toward the upper light output surface.

Figure 1:
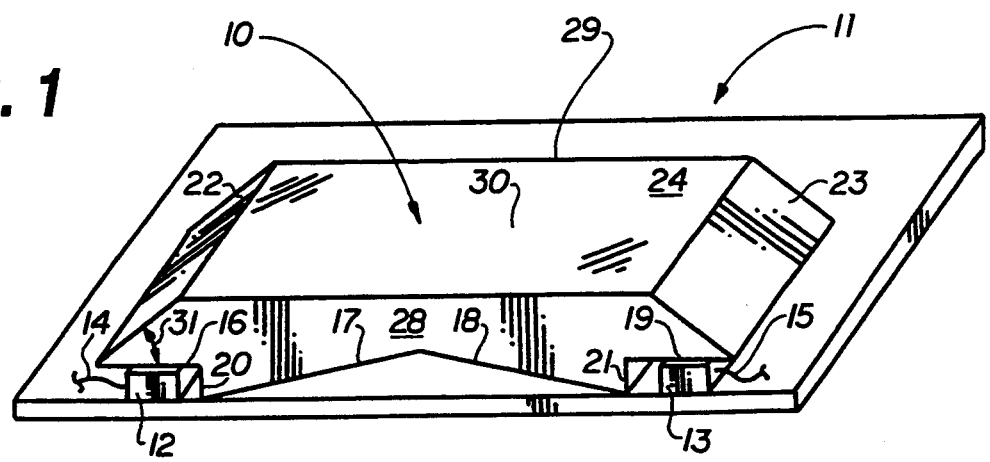
FIG. 1 is a perspective view illustrating a backlighting apparatus constructed in accordance with the invention.
Figure 2:
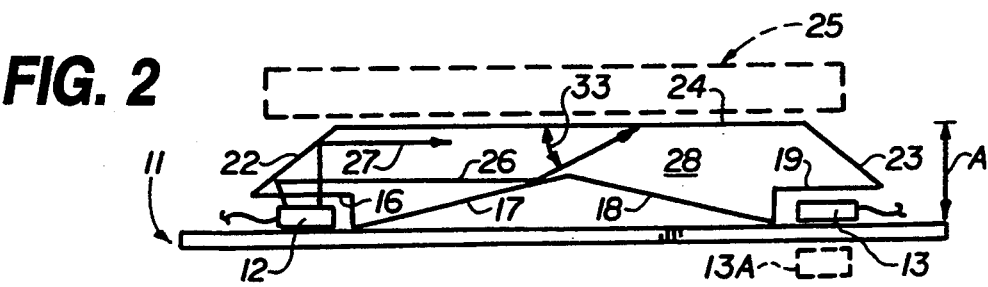
FIG. 2 is a side elevation view illustrating the mode of operation of the backlighting apparatus of FIG. 1 in conjunction with an LCD; and, FIG. 3 is a perspective view illustrating the light pipe utilized in the apparatus of FIG. 1.
Figure 3:
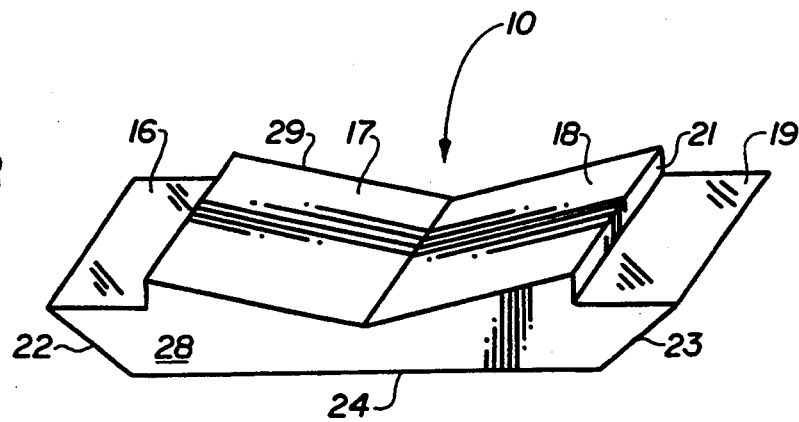

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 to 3 illustrate a backlight assembly constructed in accordance with the principles of the invention. The backlighting apparatus of FIGS. 1 and 2 includes a printed circuit board 11, light pipe 10 mounted on board 11, and dies 12 and 13 mounted on board 11. One or more dies 12 can be mounted on board 11 beneath surface 16. One or more dies 13 can be mounted on board 11 beneath surface 19. Wires 14 and 15 supply electrical energy to dies 12 and 13, respectively, to cause the dies to produce light which travels upwardly into light pipe 10. Light pipe 10 includes an upper light output surface 10, canted rectangular light reflective surfaces 22 and 23, and a bottom portion. Surfaces 22 and 23 are preferably canted at an acute angle 31 of thirty to sixty degrees with respect to surface 16 and to circuit board 11. The bottom portion of light pipe 10 includes light transparent rectangular surfaces 16, 19, 20, and 21 and light reflective surfaces 17 and 18. In FIGS. 1 to 3, surfaces 16 and 22 bound the triangular left hand wing or side of light pipe 10. Rectangular surfaces 19 and 23 bound the triangular right hand wing or side of light pipe 10. The wings or ends of pipe 10 can take on any desired shape or dimension.

Light pipe 10 is formed of a transparent material like glass or a transparent plastic such as an acrylic or polystyrene. Surfaces 17, 18, 22 and 23 of light pipe 10 are coated with an opaque white paint or other light reflective material. Light generated by die 12 travels upwardly through transparent surface 16 into the left hand wing of pipe 10. Light from die 12 traveling into the left hand wing of pipe 10 is reflected from surface 22 in the manner indicated by arrows 26 and 27 in FIG. 2. As the reflected light travels inwardly into pipe 10 from surface 22, the light travels toward surface 24 and in directions generally parallel to upper light output surface 24 and to the circuit board 11. Some of the light reflected from surface 22 is also subsequently reflected off of surface 17 upwardly toward surface 24 in the manner indicated by arrow 26 in FIG. 2. Surfaces 17 and 18 perform the important function of increasing the concentration or strength of light near the center 30 of surface 24 such that the intensity of light emitted from surface 24 tends to be uniform at each point on surface 24. If desired, a die 13 can be positioned beneath board 11 in the manner indicated by dashed lines 13A in FIG. 2. Light from a die 13A would travel upwardly through an aperture formed in board 11, through transparent surface 19, and off of surface 23 toward the center 30 of pipe 10. Light reflected from surface 23 travels toward surface 24 in paths generally parallel to output surface 24 and board 11. As used herein, paths of travel of light reflected from surfaces 22, 17, 18, 23 are parallel to surface 24 and board 11 if said paths are at an angle 33 to surface 24 and board 11 of thirty degrees or less. While the light beam indicated by arrow 27 in FIG. 2 is travelling toward and parallel to surface 24, surface 22 (and 23) can be canted such that light travels in a direction of travel upwardly to surface 24 or travels in a direction of travel directly toward surface 17 to be reflected upwardly directly toward surface 24.

The apparatus of FIG. 1 is used to backlight a LCD by placing the upper light output surface 24 adjacent a LCD 25 in the well known fashion illustrated in FIG. 2.

The height A of pipe 10 is in the range of 0.010 to 0.250 inch, is preferably in the range of 0.080 to 0.150 inch. The use of dies 12 and 13 is critical in the practice of the invention. A die typically only costs one cent, which is much less than other light generating devices used to backlight a LCD. As used herein, the term "die" indicates any substrate comprised of a semiconductor material like silicon that is doped to generate light when electrical current is applied to the die. A die comprises a component of a LED (light emitting diode) and does not, standing alone, comprise a LED. As used herein, a "LED" includes a clear epoxy encapsulate placed over a die to "pot" or "mold" the die and to form a convex housing which disperses and spreads light emanating from the die. A single wire or electrical lead is ordinarily attached to the die to cause light to emanate from the die. The die can be driven by a current supplying circuit. In the die 12 used in the invention light travels from the die 12, through air, and through surface 16. Or, light can travel from the die directly through surface 16 if the die is very close to surface 16. The space between die 12 and surface 16 is in the range of 0.00003937 inch to 0.500 inch, preferably 0.005 to 0.100 inch. Dies 12 and 13 are not incandescent lamps or fiber optic cables.

The height of a die 12 to 13 equals the distance the die and board wire extends above board 11 and is typically 0.005 to 0.050 of an inch. The small size of a die 12 to 13 is critical in the invention because it permits the die to be placed beneath pipe 10 on board 11 so that light can travel upwardly from the die into the bottom of pipe 10 and through surface 16 thereof. The formation of pipe 10 to permit a die 12 to be housed intermediate surface 11 and circuit board 11 is also important in enabling the backlighting apparatus of the invention to have a low height or profile indicated by arrows A. The height of light pipe 10 is in the range of 0.010 to 0.250 inch and is preferably in the range of 0.080 to 0.150 inch. When the height of the light pipe 10 is less than 0.010 inch, the invention typically does not generate a great enough concentration of light at surface 24. For example, a height A of 0.006 inch is not acceptable.

When LEDs are utilized as a source of light for a light pipe, the LEDs are typically placed at the side, and not beneath, the light pipe. Placing the LED at the side of the light pipe consumes significantly more space on a printed circuit board than the backlighting apparatus of the invention. And, importantly, an LED typically costs seven cents while a die costs only a penny. The Blackington patent discussed above also teaches the process of directing light into a light pipe through a side wall of the light pipe.

Having described my invention in such terms as to enable those skilled in the art to understand and practice it, and having identified the presently preferred embodiments thereof, I claim:

1. An liquid crystal display (LCD) assembly including
   (a) a LCD;
   (b) means positioned adjacent said LCD for backlighting said LCD, said backlighting means including
      (i) a printed circuit board,
      (ii) a light pipe mounted on said printed circuit board and having a wing spaced above said circuit board and including a light reflective surface canted with respect to said circuit board, and,
      (iii) a light generating die mounted on said circuit board intermediate said wing and said circuit board, light from said die traveling upwardly away from said circuit board and toward and into said wing, and reflecting off of said reflective surface in directions of travel generally parallel to said circuit board and said LCD and traveling into said light pipe to back light said LCD.

2. A light pipe assembly including
   (a) a printed circuit board;
   (b) a light pipe mounted on said printed circuit board and having a wing spaced above said circuit board and including a light reflective surface canted with respect to said circuit board; and,
   (c) a light generating die mounted on said circuit board, light from said die traveling upwardly away from said circuit board and toward and into said wing, and reflecting off of said reflective surface in directions of travel generally parallel to said circuit board and traveling into said light pipe.

* * * * *